March 11, 1941.   F. H. JOHNSON   2,234,435
CONDUCTING CABLE
Filed Dec. 23, 1939
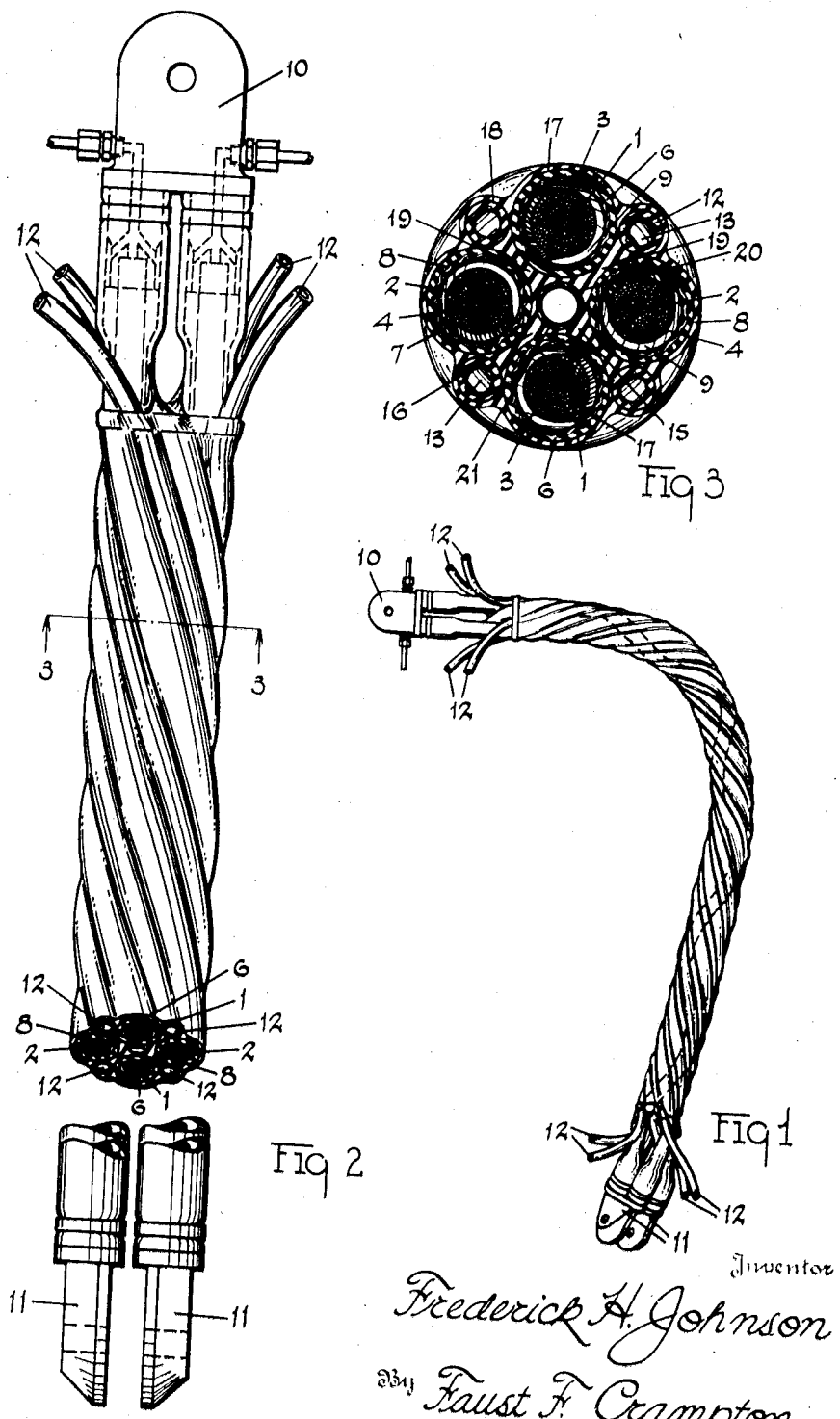
Inventor
Frederick H. Johnson
By Faust F. Crampton
Attorney Patented Mar. 11, 1941

2,234,435

UNITED STATES PATENT OFFICE 2,234,435

CONDUCTING CABLE

Frederick H. Johnson, Ferndale, Mich.

Application December 23, 1939, Serial No. 310,671

1 Claim. (Cl. 174—15)

My invention relates to a conduit means for conducting electric current and fluid from sources thereof to a movable device, to or through which the current and fluid is applied to perform certain useful work. The invention, particularly, relates to a means for supporting current and fluid conductors in a predetermined disposed relation enabling efficient conduction to and unrestricted mobility of the movable device. The invention, in one embodiment thereof, readily lends itself to use in conjunction with conductors for conducting electric current and conductor and electrode cooling liquid from the respective sources thereof to a portable welder and its operating parts.

The invention has for an object to provide a means for supporting a group or plurality of conductors for conducting electricity and fluid in a unitary and predetermined interrelation permitting ready flexure of the cable to accommodate for the movements of one end of the cable group, connected as it may be to a tool device, relative to the other end of the cable group, connected as it may be to electrical and fluid sources. Further, in this connection, the invention has for an object to provide a multiple conductor-supporting means of an inherently flexible characteristic having portions adapted to receive conductors and operative, either by reason of the particular form of embodiment thereof or in conjunction with cooperative parts, to yieldingly sustain and retain the conductors in a predetermined and desired interrelation.

Another object of my invention is to provide a multiple conductor-supporting means having conductor receiving portions that are so related, one to the other, as to support each of the plurality of electrical conductors in spaced and equal distance from a common longitudinally extending line. In this connection, my invention provides, where used in conjunction with welder cables, a means for materially reducing or entirely eliminating the effects of the induced and magnetically reactive fields surrounding the electric conductors conducting welding current to the welder and tending to cause the cables to objectionably jerk and "kick" and result, also, in secondary voltage losses.

A still further object of the invention is to provide a multiple conductor-supporting means having conductor-receiving portions adapted to support the conductors spirally about a common central axis to lock the conductors as against relative movement of any one thereof and materially reduce the strain and stress on any one or more of the conductors, as the group is bent upon itself, during the movement of the device, to which the group may be connected. In this connection, the invention provides a means for supporting a plurality of conductors, each of which are markedly resistant to bending, in such a relation that the group of conductors may be easily and repeatedly bent without deleterious results to any one conductor of the group, by reason of said bending.

The invention consists in other features and advantages which will appear from the following description and upon examination of the drawing. Structures containing the invention may partake of different forms and still embody the invention. To illustrate a practical application of the invention, I have selected a conducting cable as an example of the various structures and details thereof that contain the invention and shall describe the selected structure hereinafter, it being understood that variations may be made without departing from the spirit of the invention. The particular structure selected is shown in the accompanying drawing and described hereinafter.

Fig. 1, of the accompanying drawing, illustrates a perspective view of a conducting cable embodying my invention. Fig. 2 illustrates an enlarged view of a partial side elevation of the conducting cable shown in Fig. 1. Fig. 3 illustrates a view of a section taken on the plane of the line 3—3 indicated in Fig. 2.

As above suggested, my invention readily lends itself to use in conjunction with welding cables, an embodiment of which is selected for purposes of illustration in the accompanying drawing and hereinafter described. As is well known, welding cables presently in use, commonly, include cable parts in which electric conductors are contained having provision for flowing a cooling fluid thereabout, together with cable parts for conducting cooling fluid to the electrodes, to which the conductors are electrically connected. In the particular embodiment shown in the accompanying drawing and for reasons that will appear hereinafter, each of the conductors 1 and 2 are divided into a pair of parts. The conductor 1 comprises parts 3 and the conductor 2 comprises parts 4. However, those skilled in the art will appreciate that, particularly, when my invention is applied to other fields of use than the particular one here chosen to illustrate the invention, the conductors 1 and 2 may be used without partition and many advantages of the invention be, nevertheless, obtained.

The conductor parts 3 and 4 are suitably formed of a plurality of loosely twisted strands of electrical conducting wire in a manner well known in the art. Each conductor part 3 is located within a cable part 6 and each conductor part 4 is located in a cable part 8. The cable parts 6 and 8 are, usually and preferably, formed of a vulcanized rubber or like composition, in which a cord fabric 7 is sometimes embedded. The cable parts 6 and 8 each have passageways extending therethrough, which are of a diameter greater than the diameter of the conductors located therein. By such dimensional relation of conductor and passageway, provision is made in portions of the passageways, such as that severally indicated at 9, through which a cooling fluid is conducted about the conductors to carry off the heat generated by the conductors in transmitting working currents to the welder. The conductors 1 and 2, and their parts 3 and 4, are connected to suitable sets of connectors 10 and 11. The connectors 10 may be connected to a source of current, such as the secondary of a transformer, and the connectors 11 may be connected to a tool, such as a welder.

In the particular embodiment shown in the drawing, cable parts 12 are provided for conducting a cooling fluid to the tool or its parts, as for example to the welder electrodes, to carry off the heat generated during welding operations. Like the cable parts 6 and 8, the cable parts 12 may be formed of vulcanized rubber or other like composition, in which a cord fabric is commonly embedded. The cable parts 12 each have a passageway 13 for conducting fluid from a source to the electrodes, being connected to each by suitable connecting means.

The cable parts 6, 8, and 12 are supported by a supporting means provided by my invention, the objects and advantages of which have been heretofore mentioned. Said supporting means may be embodied in a core part 15. The core part 15 may be formed from a vulcanized rubber or other like flexible and resiliently cushioning material. The core part 15 may be formed by molding, extruding through a die, by dipping, or in any other satisfactory manner to form an elongated central body portion 16 and a plurality of parallel, linearly extending conductor-receiving portions surrounding the central longitudinal axis of said body portion 16. In the particular construction shown herein, said conductor-receiving portions are embodied in the portions of the core part 15, which define the passageways 17 and 18.

In the particular construction shown herein, the passageways 17, through which the cable parts 6 and 8 extend, are each located an equally spaced radial distance from the central longitudinal axis of the body portion 16 of the core part and in close proximity to each other. The portions 19 of the core part 15 that form the passageways 17 extend radially from its central longitudinal axis of the core part and form resiliently yieldable fins, tending to absorb the forces with which the cable parts 6 and 8 tend to move relative to each other during use. The fin portions 19, therefore, operate to yieldably retain the cable parts in a desired predetermined relation. The passageways 18, through which the cable parts 12 extend, are each located an equally spaced radial distance from the central longitudinal axis of said core body portion 16 and are disposed, substantially, intermediate adjacent passageways 17, and at a greater distance from said core axis than said passageways 17. By such disposition of the passageways 18, the cable parts 12, located therein, operate to lock the cable parts 6 and 8 against outward radial relative movement by causing a physical congestion to develop between the normally immobile cable parts 12 and any adjacent cable part tending to move.

Thus, it will be apparent that each of the plurality of conductors are cushioningly supported in a unitary relation and yieldably retained against relative movement from a predetermined spaced relation despite the bending and flexure of the plurality of conductors in the manipulation of the tool, to which the cable may be connected and the magnetic reaction produced by the electric conductors. The body portion 16 may be, also, provided with a central passageway 20, in which a fluid conductor may be located.

In order to reduce the voltage loss and physical effects produced by the induced magnetic fields around the conductors, my invention contemplates the disposition of each of the parts 3 of conductor 1 in alternate arrangement with each of the parts 4 of conductor 2 about the central longitudinal axis of the body portion 16. Thus, as shown in Fig. 3 of the accompanying drawing, the cable parts 6, containing parts 3 of conductor 1, are located in diametrically opposite passageways 17 and each of the cable parts 8, containing the parts 4 of conductor 2, are located in diametrically opposite passageways 17, adjacent to the passageways containing cable parts 6. Consequently, the parts of the conductor 1 are so remotely spaced from each other and the neighboring parts of conductors 1 and 2 are so nearly adjacent to each other, that the magnetic field produced by one conductor part is neutralized by the magnetic fields produced by the neighboring conductor parts, notwithstanding the reenforced effect thereon of the magnetic field produced by the other conductor part and the voltage losses and kicking effects normally produced are substantially eliminated.

Preferably, to provide for the flexure and bending of the unitary arrangement of conductors with a minimum of strain and stress of the cable and the conductors contained therein, the conductor-supporting portions or the passageways 17, in the particular embodiment here described, extend spirally about the central longitudinal axis of the core apart from the end thereof adjacent to cable connectors 10 to the other end thereof adjacent to the cable connectors 11. The cable parts 6, 8, and 12, when located in said passageways 17, extend spirally about the central longitudinal axis of said core part. Thus, the conductors entwine the core part 15 so that forces tending to relatively move the cable or any portions thereof are effectively and yieldingly resisted in all directions by other portions of the cable. Preferably, in the form shown in the accompanying drawing, the lay of the conductors is such that a complete circuit about the central longitudinal axis of the core part is made in each 28 to 30 inches of linear progression of the cable along said core part.

It will be further observed, in this connection, that, by reason of the aforedescribed spiral formation of the cable parts, no portion of any one conductor is exposed to an exhaustive strain or stress in the bending of the cable, as illustrated in Fig. 1 of the drawing. Each cable part has adjoining portions thereof, which are located in progressively closer relation to the axis of bending of the multiple of conductors and, thus, the strain exerted on the conductor portions most remote from the axis of bend is compensated for by the stress on the conductor portions more proximate to the axis of bend. The resistance to bending of the cable is, thereby, materially lessened and a tool, to which the cable is connected, may be manipulated with ease and without cable restriction.

The cable parts 6, 8, 12, and 21 may be supported for free withdrawal from their respective passageways, in the core part 15, whereby replacement and substitution may be effected with ease. If desired, the cable parts may be caused to adhere to the walls of their respective passageways, as by vulcanizing the assembled core part and cable parts. When the cable parts are to adhere to the walls of their passageways, the core part 15 and its conductor-supporting portions may be formed by, first, bunching the cable parts in a group and twisting the group to produce the desired spiral formation and, then, by repeated dippings of the twisted group into a rubber solution. The core part and cable parts may then be vulcanized to form an integrated cable for use in conjunction with tools.

While in accordance with the provisions of the statutes, I have illustrated and described the best form of my invention now known to me, those skilled in the art will readily understand that many changes may be made in the form of construction disclosed, without departing from the spirit of my invention, as set forth in the appended claim.

I claim:

A cable comprising a yieldable and expansible elongated central core having integrally formed fins extending radially and spirally from and about the central longitudinal axis of the core and yieldable tubular portions integrally connected to and located between the fins; electrical conductors disposed in the tubular portions; and yieldable tubular portions integrally connected to the outer edges of the said fins and to the outer surfaces of the first-named tubular portions for conducting fluids therethrough and cooperating with the fins to counteract the inductive electrical reactance and radial movement of the electrical conductors by the flow of the current through the conductors.

FREDERICK H. JOHNSON.